United States Patent
Otsuki et al.

(10) Patent No.: US 11,182,479 B2
(45) Date of Patent: Nov. 23, 2021

(54) CALL STACK ACQUISITION DEVICE, CALL STACK ACQUISITION METHOD, AND CALL STACK ACQUISITION PROGRAM

(71) Applicant: NIPPON TELEGRAPH AND TELEPHONE CORPORATION, Tokyo (JP)

(72) Inventors: Yuto Otsuki, Musashino (JP); Yuhei Kawakoya, Musashino (JP); Makoto Iwamura, Musashino (JP); Takeo Hariu, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 159 days.

(21) Appl. No.: 16/628,263

(22) PCT Filed: Jul. 2, 2018

(86) PCT No.: PCT/JP2018/025117
§ 371 (c)(1),
(2) Date: Jan. 3, 2020

(87) PCT Pub. No.: WO2019/013033
PCT Pub. Date: Jan. 17, 2019

(65) Prior Publication Data
US 2020/0218803 A1 Jul. 9, 2020

(30) Foreign Application Priority Data
Jul. 10, 2017 (JP) .............................. JP2017-134516

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .. G06F 21/554; G06F 2221/034; G06F 11/07; G06F 21/56
See application file for complete search history.

(56) References Cited

U.S. PATENT DOCUMENTS

| 6,560,773 B1 * | 5/2003 | Alexander, III | G06F 11/3466 |
|---|---|---|---|
| | | | 707/999.202 |
| 7,028,056 B1 * | 4/2006 | Hendel | G06F 11/3636 |

(Continued)

OTHER PUBLICATIONS

International Search Report and Written Opinion dated Sep. 10, 2018 for PCT/JP2018/025117 filed on Jul. 2, 2018, 7 pages including English Translation of the International Search Report.

(Continued)

*Primary Examiner* — Christopher C Harris
(74) *Attorney, Agent, or Firm* — Xsensus LLP

(57) ABSTRACT

A call stack acquisition device reproduces, from a memory dump, a memory space of a process to which a thread as a production target of a call stack belongs. Then, the call stack acquisition device acquires execution context of the thread by acquiring, from a virtual memory space, register information of the thread, which is stored in a memory by an OS. In addition, the call stack acquisition device acquires a current stack position and a currently executed function from the acquired execution context. Thereafter, the call stack acquisition device acquires the call stack by tracing return addresses of a series of functions as callers of the currently executed function on the stack from metadata of an execution file of the process including the thread.

5 Claims, 8 Drawing Sheets

(56) References Cited

U.S. PATENT DOCUMENTS

| | | | |
|---|---|---|---|
| 10,621,026 B2* | 4/2020 | Berger | G06F 11/0769 |
| 2003/0005414 A1* | 1/2003 | Elliott | G06F 11/0766 |
| | | | 717/128 |
| 2004/0083460 A1* | 4/2004 | Pierce | G06F 9/4486 |
| | | | 717/131 |
| 2005/0050389 A1* | 3/2005 | Chaurasia | G06F 11/366 |
| | | | 714/15 |
| 2006/0026579 A1* | 2/2006 | Gardner | G06F 11/362 |
| | | | 717/151 |
| 2007/0101324 A1* | 5/2007 | Lupu | G06F 9/524 |
| | | | 718/1 |
| 2007/0105607 A1* | 5/2007 | Russell | G06F 11/0778 |
| | | | 463/1 |
| 2011/0265182 A1 | 10/2011 | Peinado et al. | |
| 2012/0297370 A1 | 11/2012 | Sale et al. | |
| 2012/0304015 A1* | 11/2012 | Devegowda | G06F 11/079 |
| | | | 714/38.11 |
| 2014/0129880 A1* | 5/2014 | Gopalakrishnan | |
| | | | G06F 11/0715 |
| | | | 714/38.11 |
| 2015/0127991 A1* | 5/2015 | Davis | G06F 11/366 |
| | | | 714/38.11 |

OTHER PUBLICATIONS

Arasteh, A.R., and Debbabi, M., "Forensic Memory Analysis—From Stack and Code to Execution History," Article in Digital Investigation, vol. 4, Supplement, Elsevier Ltd., Sep. 2007, pp. S114-S125.

Dolan-Gavitt, B., "The VAD tree: A process-eye view of physical memory," Article in Digital Investigation, vol. 4, Supplement, Elsevier Ltd., Sep. 2007, pp. S62-S64.

Hejazi, S.M., et al., "Extraction of forensically sensitive information from windows physical memory," Article in Digital Investigation, vol. 6, Supplement Elsevier Ltd., Sep. 2009, pp. S121-S131.

Ligh, M.H., et al., "The Art of Memory Forensics: Detecting Malware and Threats in Windows, Linux, and Mac Memory," John Wiley & Sons, Inc., Jul. 2014, 912 Pages.

* cited by examiner

CALL STACK ACQUISITION DEVICE, CALL STACK ACQUISITION METHOD, AND CALL STACK ACQUISITION PROGRAM

CROSS-REFERENCE TO RELATED APPLICATIONS

The present application is based on PCT filing PCT/JP2018/025117, filed Jul. 2, 2018, which claims priority to JP 2017-134516, filed Jul. 10, 2017, the entire contents of each are incorporated herein by reference.

FIELD

The present invention relates to a call stack acquisition device, a call stack acquisition method, and a call stack acquisition program.

BACKGROUND

Along with the spread of computers and the Internet, cyber attacks are becoming more sophisticated and diversified. Unknown computer viruses (malware) are often used in targeted attack on a particular organization, and thus it is difficult to prevent the attack from happening. Accordingly, taking immediate measures such as cause specification and damage minimization are required after suffering an attack.

One method in an incident response performing such measures is memory analysis on a damaged terminal called memory forensics. A computer operates while storing commands (codes) to be executed and data to be used in a memory. Accordingly, the memory stores execution states (operation states) at the moment, such as the states of operated applications, opened files, resources such as a registry, executed codes, read and written data, communication destinations, and transmitted and received data. Thus, it is possible to understand what was happening at that moment by analyzing data remaining in the memory.

However, with the existing memory forensics technology, it is difficult to know specific operations performed by individual operated applications, and the like. Examples of methods of knowing the operation state of an application include a technology called stack trace, which is used in debugging of a computer program or the like. Each thread that executes an application has a data region called stack in which an address (return address) indicating a caller is stacked each time a function is called. Each return address stacked in the stack is used to return to a caller function when processing of a called function ends, and then discarded. The stack trace clarifies the nested state (call stack) of function calls at that moment by analyzing the structure of the stack and acquiring held return addresses. Thus, it is thought to be possible to determine the operation state of an application when a result equivalent to that of the stack trace is obtained from a memory dump for each thread that has executed the application.

A typical stack trace acquires return addresses by tracing frame pointers (or base pointers) stored in a stack. The stack holds data used by functions in addition to the return addresses. Unlike a stack pointer indicating the head of the stack, a frame pointer indicates a data region in the stack, which is used by a currently executed function. A typical function first stacks the value of a frame pointer used by a caller onto the stack, and sets the position thereof as the frame pointer of the function.

Specifically, as illustrated in FIG. 1, a frame pointer used by a caller function exists at a position indicated by the frame pointer in a stack, and a return address to the caller is stored in the previous entry. Thus, return addresses in the stack can be acquired by repeating, from the value of the current frame pointer, acquisition of the previous frame pointer and the return address.

CITATION LIST

Non Patent Literature

Non Patent Literature 1: S. M. Hejazi, et al., "Extraction of Forensically Sensitive Information from Windows Physical Memory", Digital Investigation 6, Supplement, S121-S131, 2009 Non Patent Literature 2: A. R. Arasteh, et al., "Forensic Memory Analysis: From Stack and Code to Execution History", Digital Investigation 4, Supplement, S114-S125, 2007

SUMMARY

Technical Problem

To apply the stack trace to the memory forensics, it is needed to perform, only from a memory dump, (1) acquisition of execution context and (2) acquisition of return addresses in a stack.

However, a typical memory dump has no execution context, except for special memory dumps (crash dump and core dump) including addition of the state of failure occurrence and the like. In other words, the typical memory dump cannot acquire the position of a stack region, the value of a frame pointer, the address of an executed code, and the like.

Furthermore, a frame pointer is not necessarily needed to execute a function, and thus some execution files use no frame pointer through compiler optimization. In addition, no frame pointer is used throughout the entire execution environment of 64-bit Windows (registered trademark) or the like. When no frame pointer is used in this manner, return addresses cannot be acquired by tracing frame pointers in a stack as described above.

Existing technologies such as technologies disclosed in Non Patent Literature 1 and Non Patent Literature 2 cannot be applied to an execution environment using no frame pointer. As a measure for an execution environment file using no frame pointer, a disclosed method performs (2) acquisition of return addresses in a stack by finding the return addresses in the stack through scanning. When the position of the stack has been specified through (1) acquisition of execution context, this method is usable whether or not a frame pointer is used, but potentially wrongly senses a function pointer or the like other than a return address.

As described above, for an environment based on the assumption that no frame pointer is used, the existing technologies cannot achieve (1) acquisition of execution context, and potentially wrongly sense (2) acquisition of return addresses in a stack. Thus, in the environment based on the assumption that no frame pointer is used, it is potentially unable to acquire a call stack indicating the operation state of an application from a memory dump.

Thus, the present invention is intended to solve the above-described problem and acquire a call stack indicating the operation state of an application from a memory dump in an environment based on the assumption that no frame pointer is used.

Solution to Problem

To solve the above-described problems, the present invention is A call stack acquisition device configured to acquire a call stack of applications having operated on a computer from a memory dump recording a state of a memory of the computer, the call stack acquisition device comprising: a memory space reproduction unit configured to reproduce, from the memory dump, a memory space of a process to which a thread as a production target of the call stack belongs; an execution context acquisition unit configured to acquire, as an execution context of the thread, register information of the thread, which is stored in the memory from the reproduced memory space; a stack position acquisition unit configured to acquire a current stack position from a stack pointer included in the acquired execution context of the thread; a function acquisition unit configured to acquire a currently executed function from a currently executed command pointer included in the acquired execution context; and a stack acquisition unit configured to specify a series of functions as callers of the currently executed function by acquiring a width of a stack used by the currently executed function by interpreting metadata embedded in an execution file included in the memory space, specifying a caller function of the currently executed function by acquiring a return address on the stack based on the acquired width of the stack, and repeating the return address acquisition based on the interpretation of the metadata with the specified caller function serving as a currently executed function, and acquire a call stack indicating the specified series of functions.

Advantageous Effects of Invention

According to the present invention, a call stack indicating the operation state of an application can be acquired from a memory dump in an environment based on the assumption that no frame pointer is used.

DESCRIPTION OF EMBODIMENT

A mode (embodiment) for carrying out the invention will be described below with reference to the accompanying drawings. The present invention is not limited to the present embodiment.

Overview

When having received inputting of a memory dump and a thread ID (thread ID of a thread as an acquisition target of a call stack), a call stack acquisition device 10 (refer to FIG. 2) according to the present embodiment collects execution context of the thread ID, and acquires the call stack indicating the operation state of an application.

The memory dump records the state of a memory of a computer and is, for example, a physical memory dump, a virtual memory dump, a live memory of the computer being executed, state storage data produced when the computer is stopped, or suspend data and a snapshot of a virtual machine, but the call stack acquisition device 10 according to the present embodiment is not affected by the kind of the memory dump and the method of acquisition thereof. The call stack acquisition device 10 needs no special tool nor function to specially add an execution state, data structure reference data, and the like at acquisition of the memory dump. Thus, the call stack acquisition device 10 can acquire a call stack when no additional information such as information at failure of the computer is included in the memory dump.

The following describes an example in which the call stack acquisition device 10 performs processing for a 64-bit application included in a memory dump of a 64-bit Windows environment, but the call stack acquisition device 10 may perform processing for a memory dump of another operating system (OS) environment.

[Configuration]

Figure 1:
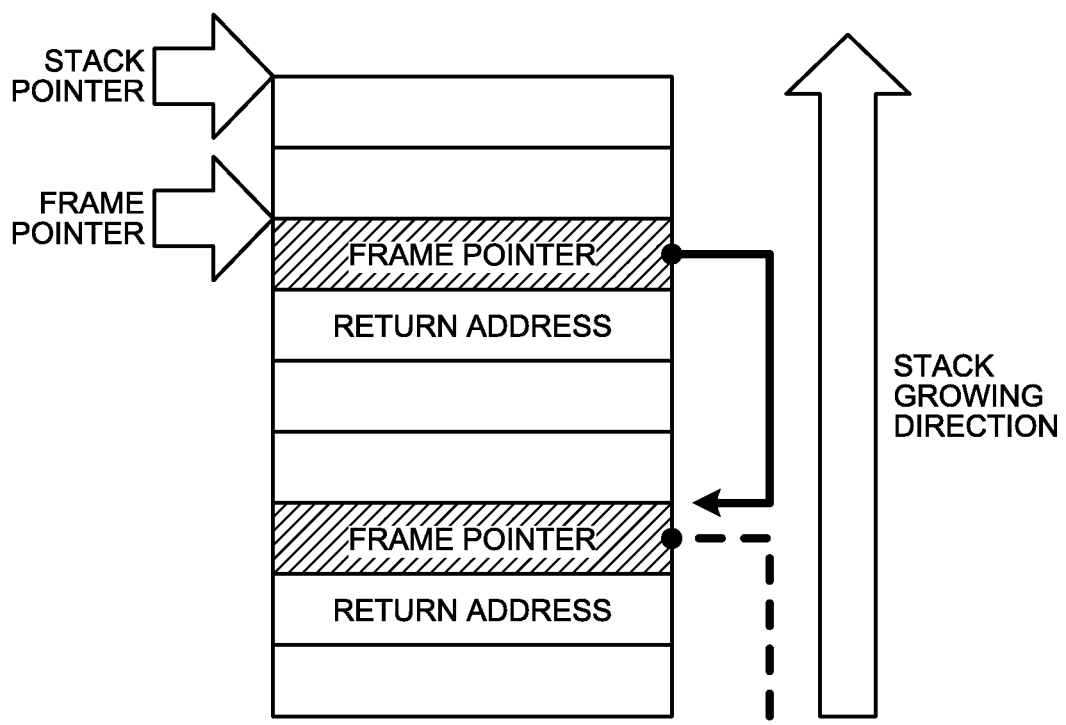
FIG. 1 is a diagram for describing the structure of a stack when a frame pointer is used.
Figure 2:
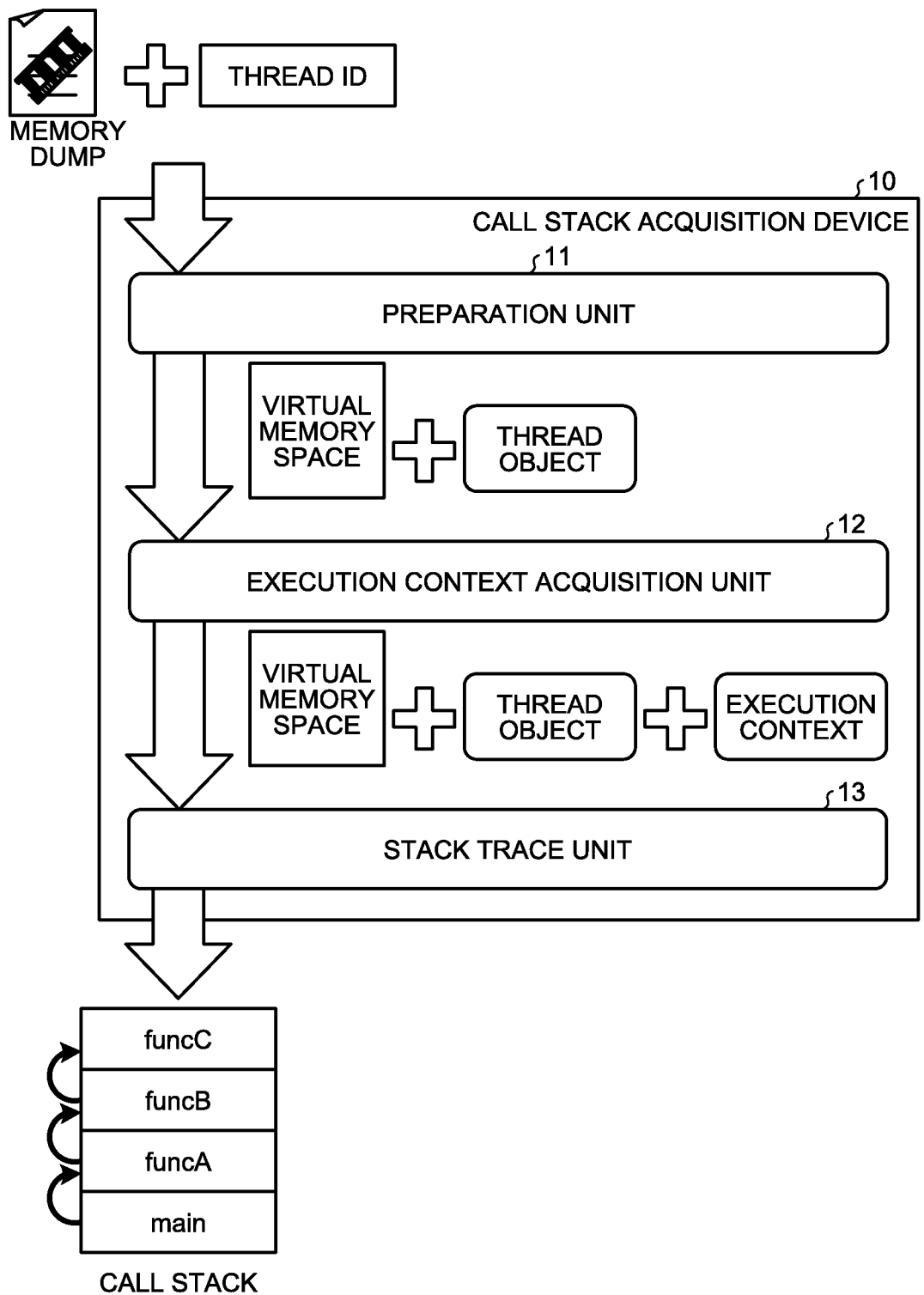
FIG. 2 is a diagram for describing an exemplary configuration and an operation outline of a call stack acquisition device according to the present embodiment.

The following describes an exemplary configuration of the call stack acquisition device 10 with reference to FIG. 2. For example, the call stack acquisition device 10 receives a memory dump and a thread ID, and acquires and outputs a call stack of a thread having the received thread ID.

The call stack acquisition device 10 includes a preparation unit (memory space reproduction unit) 11, an execution context acquisition unit 12, and a stack trace unit 13.

The preparation unit 11 receives a memory dump and a thread ID, reproduces, from the memory dump, a virtual memory space of a process to which a thread having the thread ID belongs, and acquires management data (thread object) of the thread.

The execution context acquisition unit 12 receives the virtual memory space and the thread (thread object) acquired by the preparation unit 11, and acquires execution context of the thread from the virtual memory space.

The stack trace unit 13 (stack position acquisition unit, function acquisition unit, stack acquisition unit) receives the thread acquired and the virtual memory space reproduced by the preparation unit 11 and the execution context acquired by the execution context acquisition unit 12, acquires a call stack by acquiring a return address to each function from a stack of the thread, and outputs the call stack.

For example, when one thread executing an application has performed a function call operation in which funcA is called from main, funcB is called from funcA, and then funcC is called from funcB, the stack trace unit 13 acquires and outputs a call stack (refer to FIG. 2) in which these functions are sequentially stacked.

The call stack acquisition device 10 uses a thread ID to identify a thread, but may use the virtual address or physical address of thread management data or the like.

The following describes the preparation unit 11 in detail. The preparation unit 11 performs (1) and (2) below: (1) reproduces the virtual memory space from the memory dump and (2) enumerates thread objects included in the memory dump and acquires a thread object corresponding to a specified thread ID.

In (1), the preparation unit 11 reproduces the virtual memory space by, for example, detecting a kernel and a page table corresponding to each process, which are included in the memory dump and interpreting data thereof. When the memory dump is a virtual memory dump, the virtual memory space is the memory dump, and thus the reproduction is unnecessary.

In (2), the preparation unit 11 acquires, for example, a thread list held by a process object (EPROCESS structural body), and a thread object corresponding to a specified thread ID by signature scanning or the like.

The above-described (1) and (2) processes are executed by using, for example, a technology disclosed in the following literature.

Michael Hale Ligh, et al., "The Art of Memory Forensics: Detecting Malware and Threats in Windows, Linux, and Mac Memory, Linux, and Mac Memory", Wiley Publishing, 2014

When using a thread list held by a process object (EPROCESS structural body), the preparation unit 11 first traces a process list held by a kernel and acquires an EPROCESS structural body indicating a process to which a target thread belongs. The list thread is held by a ThreadListHead member of the EPROCESS structural body, and thus the preparation unit 11 can enumerate a thread object (ETHREAD structural body) corresponding to the target thread ID by searching for the list.

When performing the signature scanning, the preparation unit 11 forms a signature of characteristics of a value held by the ETHREAD structural body, and finds the ETHREAD structural body by scanning through a physical address space or a virtual address space.

The following describes the execution context acquisition unit 12 in detail. The execution context acquisition unit 12 first acquires, from a thread object acquired by the preparation unit 11, execution context held by the thread object.

Figure 3:
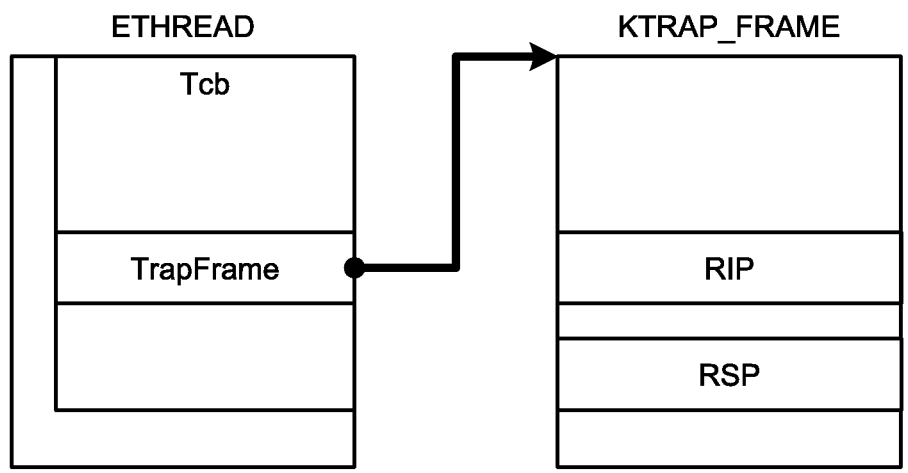
FIG. 3 is a diagram for describing the relation between an ETHREAD structural body and a KTRAP_FRAME structural body.

In Windows, when issue or interruption of a system call has occurred, register values used so far are stored in, for example, a structural body called KTRAP_FRAME in a memory. As illustrated in FIG. 3, a pointer of the KTRAP_FRAME structural body is held by a Tcb.Trap-Frame member in an ETHREAD structural body. Thus, it is possible to acquire various register values by tracing the above-described structure from the thread object, which is the ETHREAD structural body, acquired by the preparation unit 11.

Although the present embodiment describes the case in which the execution context acquisition unit 12 uses the KTRAP_FRAME structural body when acquiring execution context, a structural body, other than the KTRAP_FRAME structural body, having a data structure in which the whole or part of execution context of a thread is held may be used. Examples of such a structural body are as follows.

For example, when the OS is Windows, a KTRAP_FRAME structural body, a CONTEXT structural body, a WOW64_CONTEXT structural body, a KTHREAD/ETHREAD structural body, a KPCR/KPRCB structural body, a TEB/NT_TIB structural body, a USER_STACK structural body, a KPROCESSOR_STATE structural body, a KNONVOLATILE_CONTEXT_POINTERS structural body, or the like may be used. When the OS is Linux (registered trademark), a thread info structural body, a thread_struct structural body, a pt_regs structural body, a task_struct structural body, a sigcontext structural body, or the like may be used. Alternatively, a jmp_buf structural body, a stack, or the like may be used.

Subsequently, the stack trace unit 13 receives the thread and the virtual memory space produced by the preparation unit 11 and the execution context acquired by the execution context acquisition unit 12, acquires a call stack by acquiring return addresses from a stack of the thread, and outputs the call stack.

Specifically, the stack trace unit 13 acquires all return addresses acquired from the stack by executing the following steps (A) and (B) and then repeatedly executing step (C). The following describes an example in which the stack trace unit 13 executes processing at steps (A) to (C) by using execution context and an execution file (PE32+ file) exemplarily illustrated in FIG. 4.

Figure 4:
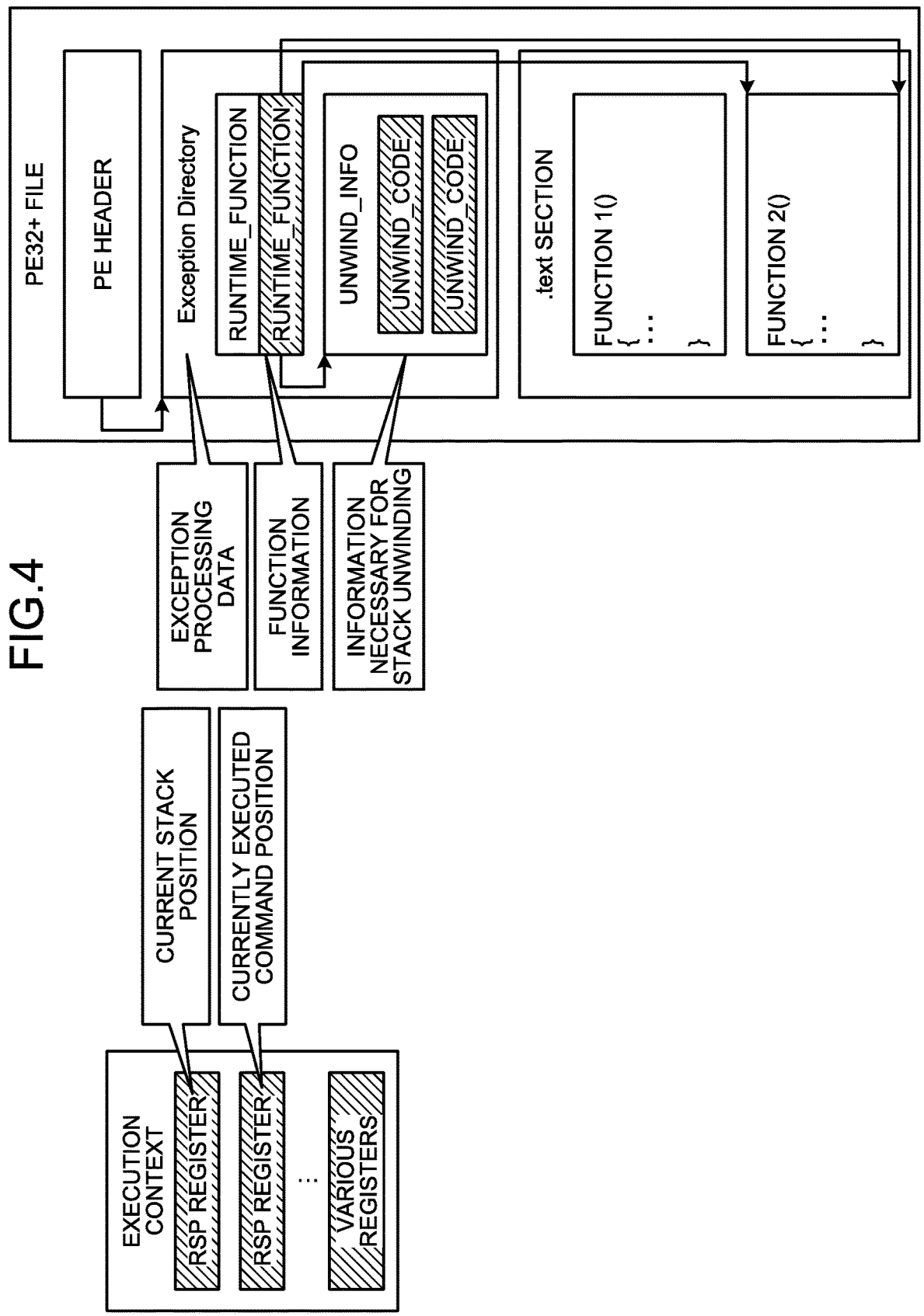
FIG. 4 is a diagram illustrating exemplary execution context and an exemplary PE32+ file used by a stack trace unit in FIG. 2.

As illustrated in FIG. 4, the execution context includes a RSP register, a RIP register, and various other registers. The PE32+ file includes a PE header, an exception directory (directory of exception processing data), a .text section, and the like. The exception processing data includes information (UNWIND_INFO, unwinding information) necessary for unwinding of the stack (in other words, unwinding of function calls) in exception processing.

Step (A): the stack trace unit 13 acquires a current stack position (upper limit) from a stack pointer (RSP register) included in the thread execution context acquired by the execution context acquisition unit 12.

Step (B): the stack trace unit 13 acquires the position of a currently executed command (function) from a currently executed command pointer (RIP register) included in the thread execution context acquired by the execution context acquisition unit 12. Accordingly, the stack trace unit 13 can acquire a currently executed function.

Step (C): the stack trace unit 13 specifies a caller function of the currently executed function acquired at step (B) by interpreting, for example, exception processing data held by an execution file in a PE32+ format (refer to FIG. 4), specifying the width of a stack used by the currently executed function, and acquiring a return address at a position to which the stack pointer is unwound from the current stack position acquired at step (A) by the specified width of the stack.

Specifically, at step (C), the stack trace unit 13 repeats the specification of the width of a stack used by a function, based on metadata embedded in the execution file included in the virtual memory space, and the return address acquisition based on the specified width. Accordingly, the stack trace unit 13 can trace, from the current stack position, a series of functions as callers of the currently executed function. Then, the stack trace unit 13 acquires a call stack in which return addresses corresponding to the series of functions as callers of the currently executed function are stacked in an order in which the functions are called.

At step (C), for example, the stack trace unit 13 interprets information (unwinding information) for unwinding of a stack corresponding to each function, in other words, a RUNTIME_FUNCTION structural body, an UNWIND_INFO structural body, and an UNWIND_CODE structural body among the exception processing data held by the PE32+ file.

The RUNTIME_FUNCTION structural body holds information of the function, specifically, a relative virtual address (RVA) to the UNWIND_INFO structural body corresponding to the range of the function.

The UNWIND_INFO structural body holds information necessary for unwinding of the stack. The UNWIND_CODE structural body holds an operation code indicating an operation related to allocation of the stack, and associated information. Examples of specific operation codes include UWOP_PUSH_NONVOL indicating push of a non-transitory integer register to the stack, and UWOP_ALLOC_SMALL and UWOP_ALLOC_LARGE indicating allocation of a region on the stack. The UNWIND_INFO structural body holds an array of UNWIND_CODE structural bodies as information on processing of allocating the stack, which is performed by the function.

The stack trace unit 13 emulates stack unwinding by interpreting these metadata, and acquires a call stack by acquiring return addresses. Details of this call stack acquisition procedure will be described later.

The call stack acquisition device 10 described above can acquire a call stack indicating the operation state of an application from the memory dump in an environment based on the assumption that no frame pointer is used.

[Processing Procedure]

Figure 5:
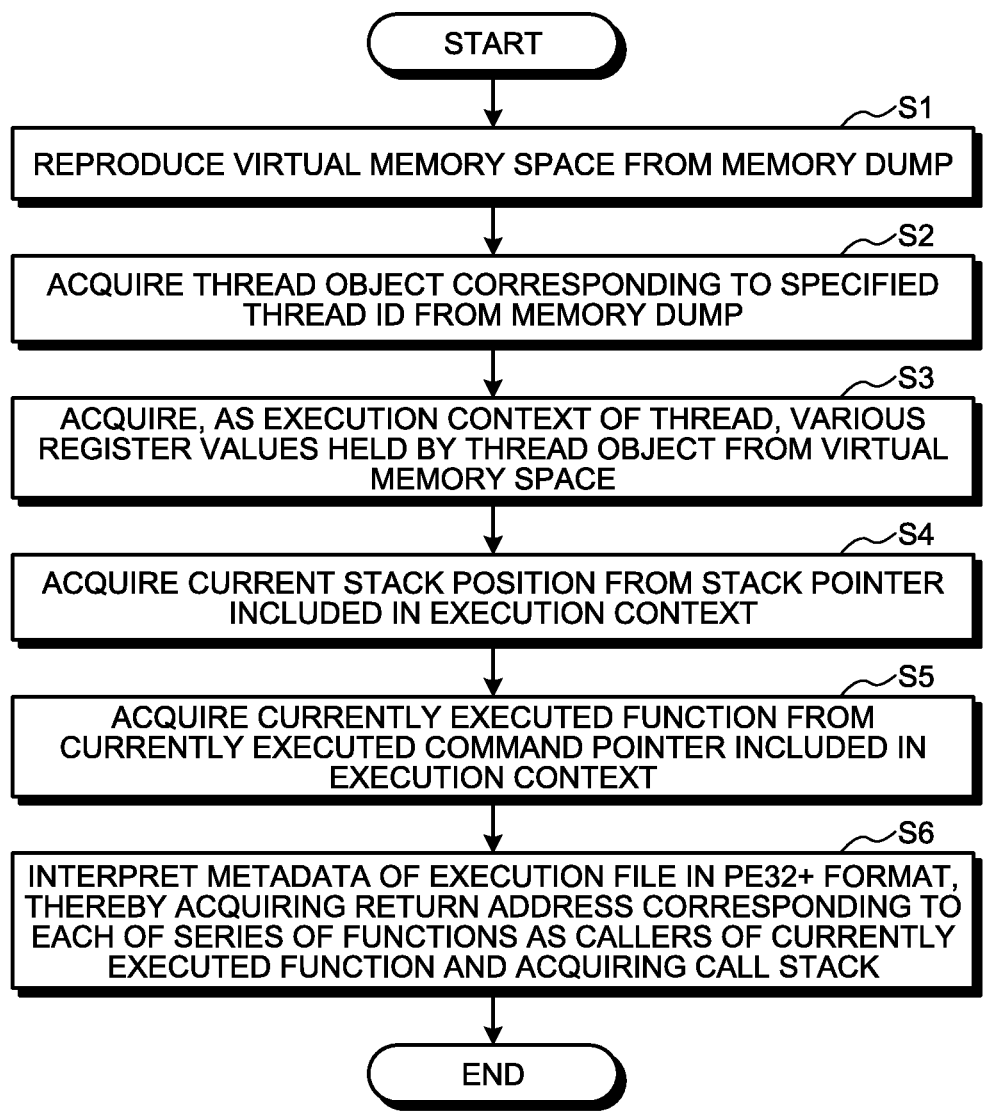
FIG. 5 is a flowchart illustrating the procedure of processing performed by the call stack acquisition device in FIG. 2.

The following describes an exemplary procedure of processing performed by the call stack acquisition device 10 with reference to FIG. 5. Assume that the call stack acquisition device 10 has already received a memory dump and a thread ID (thread ID of a thread as an acquisition target of a call stack). The following describes an example in which the execution file is an execution file in the PE32+ format.

The preparation unit 11 of the call stack acquisition device 10 reproduces a virtual memory space from the memory dump (S1) and acquires a thread object corresponding to the specified thread ID from the memory dump (S2). Subsequently, the execution context acquisition unit 12 acquires, as execution context of the thread, various register values held by the thread object from the virtual memory space (S3).

After S3, the stack trace unit 13 acquires a current stack position from a stack pointer included in the execution context acquired at S3 (S4), and acquires a currently executed function from a currently executed command pointer included in the execution context acquired at S3 (S5). Thereafter, the stack trace unit 13 interprets metadata of the execution file in the PE32+ format included in the memory dump, thereby acquiring a return address corresponding to each of a series of functions as callers of the currently executed function and acquiring a call stack (S6). Then, the stack trace unit 13 outputs the acquired call stack.

Figure 6:
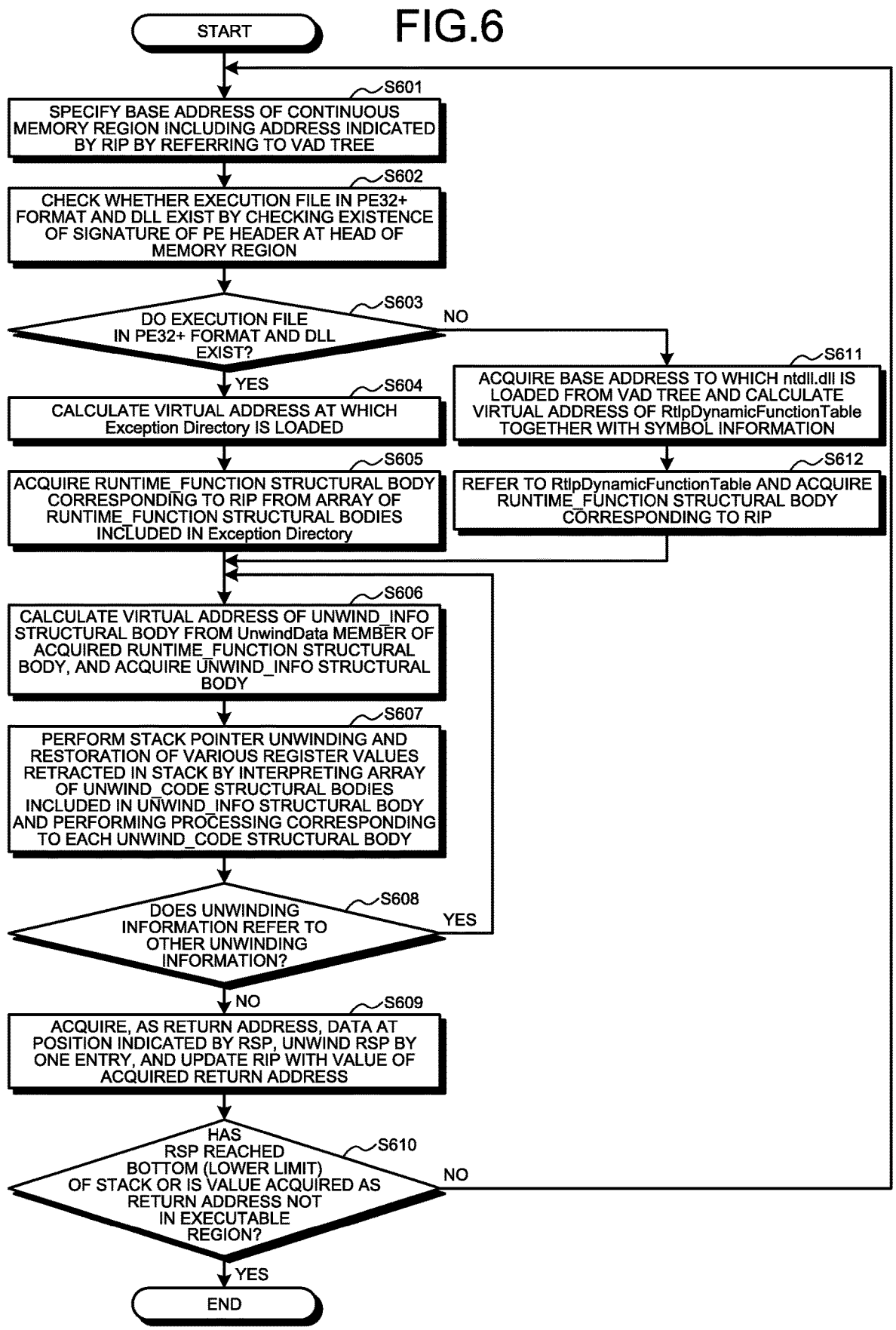
FIG. 6 is a flowchart illustrating in detail, in processing at S6 in FIG. 5, processing of acquiring a return address corresponding to each of a series of functions as callers of a currently executed function by interpreting metadata of an execution file (for example, an execution file in a PE32+ format) included in a memory dump.

The following describes, in detail with reference to FIG. 6, the processing of acquiring a return address corresponding to each of a series of functions as callers of the currently executed function by interpreting metadata of the execution file included in the memory dump in the processing at S6 in FIG. 5. The following describes an example in which the execution file is an execution file in the PE32+ format.

First, the stack trace unit 13 specifies the base address of a continuous memory region including an address indicated by a RIP by referring to a VAD tree as a memory map management data structure held by a process object (EPROCESS structural body) (S601). This VAD tree reference method is a method disclosed in, for example, the following literature.

Brendan Dolan-Gavitt, "The VAD Tree: A Process-Eye View of Physical Memory", Digital Investigation 4, Supplement, S62-S64, September 2007

After S601, the stack trace unit 13 checks whether the execution file in the PE32+ format and a dynamic link library (DLL) exist by checking the existence of a signature of a PE header at the head of the memory region specified at S601 (S602).

When having checked at S602 that the execution file in the PE32+ format and the DLL exist by checking the existence of the signature of the PE header (Yes at S603), the stack trace unit 13 acquires the RVA of an exception directory (IMAGE_DIRECTORY_ENTRY_EXCEPTION) by interpreting the PE header, and calculates a virtual address at which the exception directory is loaded (S604).

After S604, the stack trace unit 13 acquires a RUNTIME_FUNCTION structural body corresponding to the RIP from an array of RUNTIME_FUNCTION structural bodies included in the exception directory (.pdata section) loaded at the virtual address calculated at S604 (S605).

After S605, the stack trace unit 13 calculates the virtual address of an UNWIND_INFO structural body from an UnwindData member of the RUNTIME_FUNCTION structural body acquired at S605, and acquires the UNWIND_INFO structural body (S606).

After S606, the stack trace unit 13 performs stack pointer unwinding (RSP update) and restoration of various register values retracted in the stack by interpreting an array of UNWIND_CODE structural bodies included in the UNWIND_INFO structural body acquired at S606 and performing processing corresponding to each UNWIND_CODE structural body (S607).

When unwinding information (information indicated by the UNWIND_INFO structural body) acquired at S606 refers to other unwinding information (Yes at S608), the stack trace unit 13 executes the processing at S606 on the UNWIND_INFO structural body of the referred other unwinding information, and executes the processing at S607 on the acquired UNWIND_INFO structural body.

At S608, when the unwinding information (information indicated by the UNWIND_INFO structural body) acquired at S606 does not refer to other unwinding information (No at S608), the stack trace unit 13 acquires, as a return address, data at a position indicated by the RSP after the unwinding at S607, unwinds the RSP by one entry, and updates the RIP with the value of the acquired return address (S609). In other words, the stack trace unit 13 moves the position (pointer) of the currently executed command to the previous function call position. Then, the stack trace unit 13 repeatedly executes the processing at S601 and later on the RIP after the update at S609 until the RSP after the update at S609 reaches the bottom (lower limit) of the stack. Specifically, when the RSP after the update at S609 has not reached the bottom (lower limit) of the stack and the value acquired as a return address is in an executable region (No at S610), the stack trace unit 13 executes the processing at S601 or later again. When the RSP after the update at S609 has reached the bottom (lower limit) of the stack or the value acquired as a return address is not in the executable region (Yes at S610), the stack trace unit 13 ends the processing. In the present embodiment, the range of the stack is the range of an allocated memory region continuous from the RSP included in the execution context, but a target range may be specified by another method. For example, when the range of the stack is managed by the OS or the like, the range may be acquired from the data structure thereof. In an alternative method, for example, the size of a range to be searched may be specified as an input value by a user.

Windows supports exception processing of a dynamically generated code, and thus prepares a dedicated management table (RtlpDynamicFunctionTable) and a registration API (RtlAddFunctionTable API or the like). Thus, at S603, when the existence of the PE header cannot be checked (No at S603), the stack trace unit 13 can acquire a RUNTIME_FUNCTION structural body by referring to the dedicated management table (RtlpDynamicFunctionTable).

Specifically, at S603, when the stack trace unit 13 cannot check the existence of the PE header (No at S603), the stack trace unit 13 first acquires a base address to which ntdll.dll is loaded from the VAD tree, and calculates the virtual address of the RtlpDynamicFunctionTable together with symbol information (S611). Then, the stack trace unit 13 refers to the RtlpDynamicFunctionTable at the virtual address calculated at S611, and acquires a RUNTIME_FUNCTION structural body corresponding to the RIP (S612). Thereafter, the stack trace unit 13 performs the processing at S606 or later by using the RUNTIME_FUNCTION structural body acquired at S612.

In this manner, the stack trace unit 13 interprets the metadata of the execution file (for example, exception processing data included in the execution file in the PE32+ format, or a management table prepared for exception processing by Windows) included in the memory dump, thereby determining a function as the caller of a function executed by the thread. Then, the stack trace unit 13 sequentially traces a series of functions as callers of the executed function, thereby acquiring a call stack in which functions executed by the thread are stacked in the order of calling.

OTHER EMBODIMENTS

The above describes an example in which the call stack acquisition device 10 uses a RUNTIME_FUNCTION structural body, an UNWIND_INFO structural body, an UNWIND_CODE structural body, and the like at call stack production, but the present invention is not limited to these structural bodies and may use a structural body having a data structure that allows specification of the width of a stack used by each function and the method of using the stack.

For example, Windows includes an FPO_DATA structural body, a STACKFRAME/STACKFRAME64 structural body, an EXCEPTION REGISTRATION RECORD structural body, an EXCEPTION RECORD structural body, an IMAGE FUNCTION ENTRY64 structural body. Thus, the call stack acquisition device 10 may acquire a call stack by using these structural bodies. In a case of an execution file in an ELF format, the call stack acquisition device 10 may acquire a call stack by using debug information in a DWARF format, such as call frame information (CFI) embedded in, for example, a .eh_frame or .debug_frame section.

The call stack acquisition device 10 according to the present embodiment is also applicable to various situations such as incident response, end-point threat monitoring, and monitoring of a virtual calculator (virtual machine or VM) by a virtualization platform.

[Exemplary Application]

Figure 7:
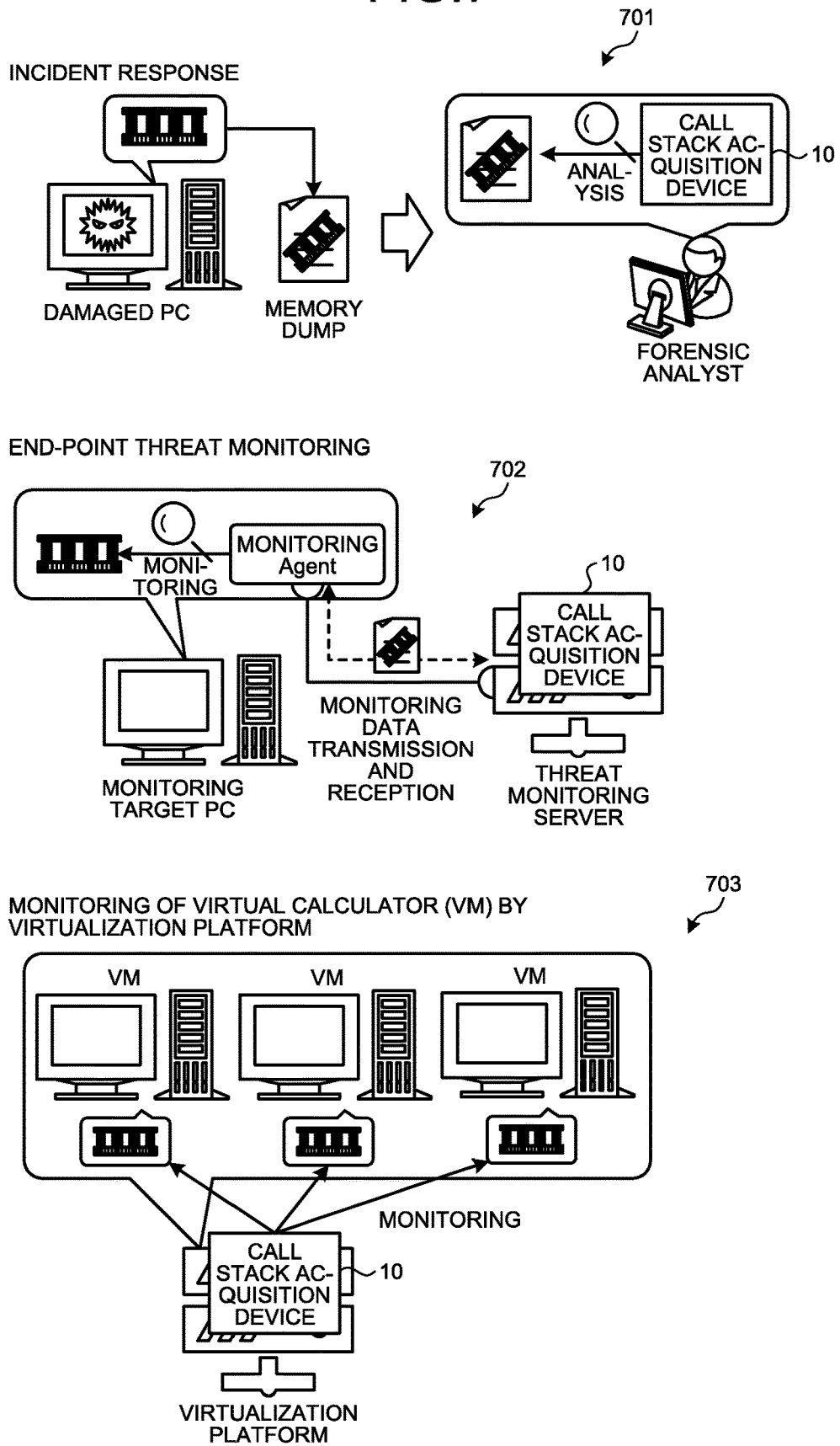
FIG. 7 is a diagram illustrating an exemplary application of the call stack acquisition device in FIG. 2.

For example, as indicated by reference sign 701 in FIG. 7, the call stack acquisition device 10 may be used in incident response. In this case, the call stack acquisition device 10 analyzes a memory dump of a damaged PC and acquires a call stack. Then, a forensic analyst or the like can discuss the damage status of the damaged PC and measures while looking at the content of a produced call stack, and immediately perform incident response.

As indicated by reference sign 702 in FIG. 7, the call stack acquisition device 10 may be used in threat monitoring of a monitoring target PC (end point) by a threat monitoring server. In this case, the call stack acquisition device 10 is employed at the threat monitoring server. Then, when having acquired monitoring data (memory dump) of a memory of the monitoring target PC monitored by a monitoring agent, the threat monitoring server analyzes the memory dump and acquires a call stack of the monitoring target PC through the call stack acquisition device 10. The threat monitoring server analyzes the acquired call stack, thereby monitoring the operation state of the monitoring target PC.

As indicated by reference sign 703 in FIG. 7, the call stack acquisition device 10 may be used in monitoring of a virtual calculator (VM) by a virtualization platform. In this case, the call stack acquisition device 10 is employed at a computer as the virtualization platform. Then, the computer as the virtualization platform monitors a memory (virtualization memory) of each VM established inside the computer, and acquires a call stack of the VM from a memory dump of the VM obtained through the monitoring. Then, the computer as the virtualization platform analyzes the call stack of the VM, thereby monitoring the operation state of each VM.

[Computer Program]

A computer program configured to achieve each function of the call stack acquisition device 10 described in the above-described embodiment can be implemented through installation onto a desired information processing device (computer). For example, the information processing device can function as the call stack acquisition device 10 by executing the above-described computer program provided as package software or on-line software. The information processing device includes a desktop or laptop personal computer. Other examples of the information processing device include mobile communication terminals such as a smartphone, a cellular phone, and a personal handyphone system (PHS), and in addition, a personal digital assistant (PDA). The call stack acquisition device 10 may be implemented on a cloud server.

Figure 8:
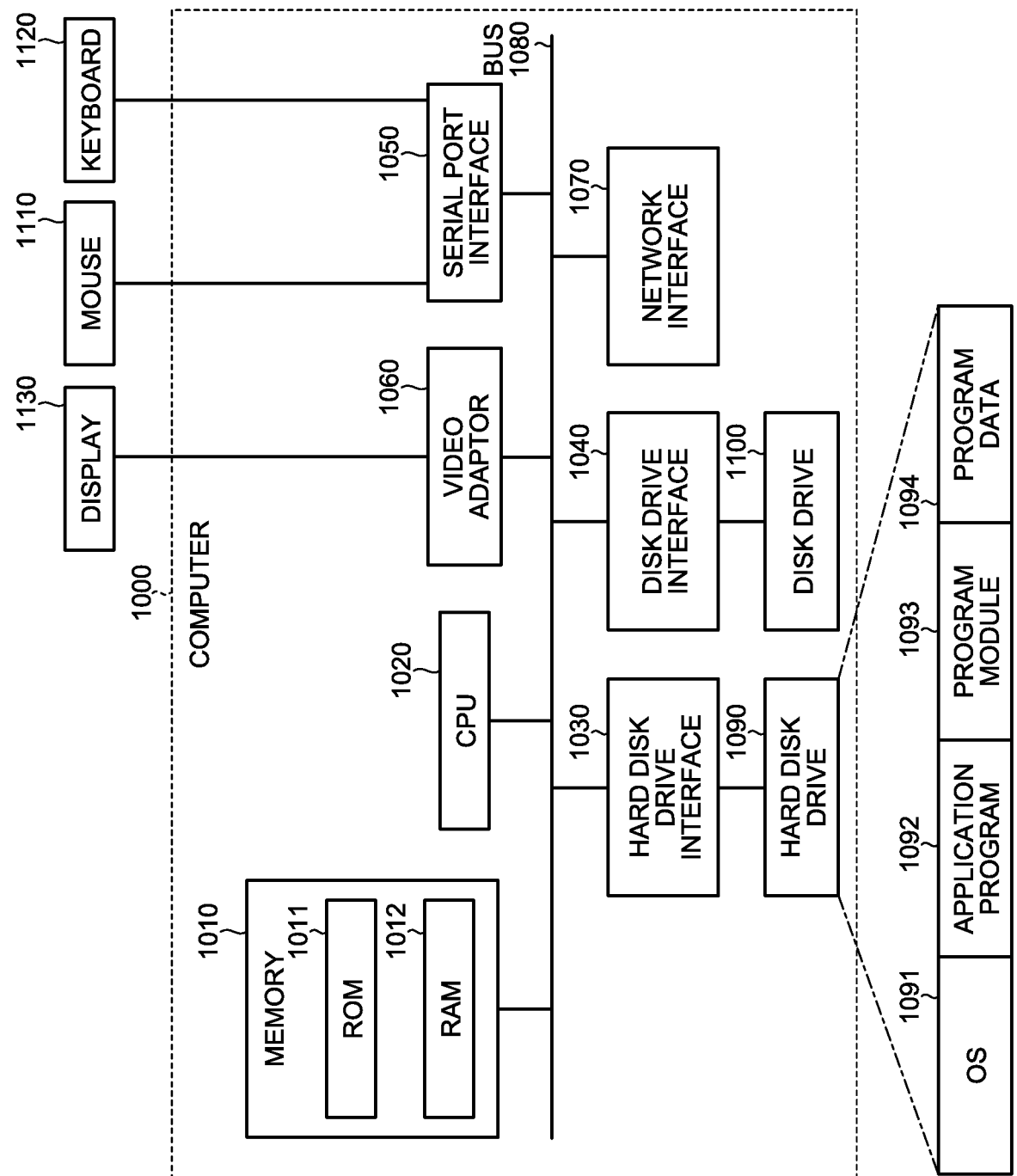
FIG. 8 is a diagram illustrating a computer that executes a call stack acquisition program.

The following describes an exemplary computer executing the above-described computer program (call stack acquisition program) with reference to FIG. 8. As illustrated in FIG. 8, this computer 1000 includes, for example, a memory 1010, a CPU 1020, a hard disk drive interface 1030, a disk drive interface 1040, a serial port interface 1050, a video adapter 1060, and a network interface 1070. These components are connected with each other through a bus 1080.

The memory 1010 includes a read only memory (ROM) 1011 and a random access memory (RAM) 1012. The ROM 1011 stores a boot program such as a basic input output system (BIOS). The hard disk drive interface 1030 is connected with a hard disk drive 1090. The disk drive interface 1040 is connected with a disk drive 1100. A detachable storage medium such as a magnetic disk or an optical disk is inserted into the disk drive 1100. The serial port interface 1050 is connected with, for example, a mouse 1110 and a keyboard 1120. The video adapter 1060 is connected with, for example, a display 1130.

As illustrated in FIG. 8, the hard disk drive 1090 stores, for example, an OS 1091, an application program 1092, a program module 1093, and program data 1094. Various kinds of data and information described above in the embodiment are stored in, for example, the hard disk drive 1090 and the memory 1010.

The CPU 1020 reads the program module 1093 and the program data 1094 stored in the hard disk drive 1090 onto the RAM 1012 as necessary, and executes each above-described procedure.

The program module 1093 and the program data 1094 related to the above-described call stack acquisition program are not limited to storage in the hard disk drive 1090, but for example, may be stored in a detachable storage medium and read by the CPU 1020 through the disk drive 1100 or the like. Alternatively, the program module 1093 and the program data 1094 related to the above-described computer program may be stored in another computer connected through a network such as a local area network (LAN) or a wide area network (WAN) and read by the CPU 1020 through the network interface 1070.

REFERENCE SIGNS LIST

10 call stack acquisition device
11 preparation unit
12 execution context acquisition unit
13 stack trace unit

The invention claimed is:

1. A call stack acquisition device configured to acquire a call stack of applications having operated on a computer from a memory dump recording a state of a memory of the computer, the call stack acquisition device comprising:
   a memory; and
   a processor coupled to the memory and programmed to execute a process comprising:
   reproducing, from the memory dump, a memory space of a process to which a thread as a production target of the call stack belongs;
   acquiring, as an execution context of the thread, register information of the thread, which is stored in the memory from the reproduced memory space;
   acquiring a current stack position from a stack pointer included in the acquired execution context of the thread;
   acquiring a currently executed function from a currently executed command pointer included in the acquired execution context; and
   specifying a series of functions as callers of the currently executed function by acquiring a width of a stack used by the currently executed function by interpreting metadata embedded in an execution file included in the memory space, specifying a caller function of the currently executed function by acquiring a return address on the stack based on the acquired width of the stack, and repeating the return address acquisition based on the interpretation of the metadata with the specified caller function serving as a currently executed function, and acquiring a call stack indicating the specified series of functions.

2. The call stack acquisition device according to claim 1, wherein the register information of the thread is register information stored in the memory by an operating system (OS) in operation of the thread.

3. The call stack acquisition device according to claim 1, wherein the metadata embedded in the execution file is information for unwinding a stack of a function used in the execution file among exception processing data embedded in the execution file.

4. A call stack acquisition method of acquiring a call stack of applications having operated on a computer from a memory dump recording a state of a memory of the computer, the call stack acquisition method comprising:
   reproducing, from the memory dump, a memory space of a process to which a thread as a production target of the call stack belongs;
   acquiring as an execution context of the thread, register information of the thread, which is stored in the memory from the reproduced memory space;
   acquiring a current stack position from a stack pointer included in the acquired execution context of the thread;
   acquiring a currently executed function from a currently executed command pointer included in the acquired execution context; and
   specifying a series of functions as callers of the currently executed function by acquiring a width of a stack used by the currently executed function by interpreting metadata embedded in an execution file included in the memory space, specifying a caller function of the currently executed function by acquiring a return address on the stack based on the acquired width of the stack, and repeating the return address acquisition based on the interpretation of the metadata with the specified caller function serving as a currently executed function, and acquiring a call stack indicating the specified series of functions.

5. A non-transitory computer-readable recording medium having stored therein a call stack acquisition program configured to acquire a call stack of applications having operated on a computer from a memory dump recording a state of a memory of the computer, the call stack acquisition program being configured to cause the computer to execute:
   reproducing, from the memory dump, a memory space of a process to which a thread as a production target of the call stack belongs;
   acquiring as an execution context of the thread, register information of the thread, which is stored in the memory from the reproduced memory space;
   acquiring a current stack position from a stack pointer included in the acquired execution context of the thread;
   acquiring a currently executed function from a currently executed command pointer included in the acquired execution context; and
   specifying a series of functions as callers of the currently executed function by acquiring a width of a stack used by the currently executed function by interpreting metadata embedded in an execution file included in the memory space, specifying a caller function of the currently executed function by acquiring a return address on the stack based on the acquired width of the stack, and repeating the return address acquisition based on the interpretation of the metadata with the specified caller function serving as a currently executed function, and acquiring a call stack indicating the specified series of functions.

* * * * *